United States Patent [19]
Fukawa et al.

[11] 3,878,202
[45] Apr. 15, 1975

[54] VITAMIN A-ACID ESTERS OF α-TOCOPHEROL AND PREPARATION THEREOF

[75] Inventors: Hideaki Fukawa, Kawagoe; Kenichi Tanaka, Tokyo, both of Japan

[73] Assignee: Nisshin Flour Milling Co., Ltd., Tokyo, Japan

[22] Filed: May 17, 1972

[21] Appl. No.: 254,046

[52] U.S. Cl. .......... 260/240 H; 260/345.5; 424/284
[51] Int. Cl. ............................................... C07d 7/22
[58] Field of Search ...................... 260/240 H, 345.5

[56] References Cited
UNITED STATES PATENTS
2,231,125  2/1941  Karrer .............................. 260/345.5
3,151,127  9/1964  Spanel ......................... 260/345.5 X Primary Examiner—John M. Ford
Attorney, Agent, or Firm—Wenderoth, Lind and Ponack

[57] ABSTRACT

This invention relates to vitamin A-acid esters of an α-tocopherol prepared by subjecting an α-tocopherol to ester condensation with a vitamin A-acid or an active substituted compound thereof such as an acid chloride to form the ester bond.

3 Claims, No Drawings

VITAMIN A-ACID ESTERS OF α-TOCOPHEROL AND PREPARATION THEREOF

BACKGROUND OF THE INVENTION

It is already well known that α-tocopherol stabilizes vitamin A in a living body and enhances the strength of its action. Recently, it is emphasized that they have a cooperative action against the destruction of epithelial tissues, for example, in the lungs to death. Further, it is discovered that lesions due to excess vitamin A can be prevented by the coexistence of α-tocopherol.

On the other hand, vitamin A-acid which is an active intermediate in the pathway to vitamin A action is biosynthesized from vitamin A alcohol in a living body. Namely, it is clarified that the functions of vitamin A to the growth-stimulation, protein metabolism, stabilization of ephithelial tissues, etc., take place through vitamin A-acid. Although vitamin A-acid may be considered to therefore be an active form of vitamin A, it has such a defect that it is liable to give rise to hypervitaminosis.

From the above-mentioned standpoint, an attempt was made to synthesize the vitamin A-acid esters of α-tocopherol and the obtained vitamin A-acid esters of α-tocopherol were tested by animal experiments to investigate their pharmacological effect. As a result, it was discovered that the present substances have effects of α-tocopherol and vitamin A-acid, and moreover have a more excellent pharmacological effect, obviating the defects which will be developed when they are present independently.

SUMMARY OF THE INVENTION

This invention relates to vitamin A-acid esters of an α-tocopherol and their preparation method comprising subjecting a tocopherol to the ester condensation with a vitamin A-acid or an active substituted compound thereof such as an acid chloride to form the ester bond.

The α-tocopherol mentioned here refers to DL-α-tocopherol, D-α-tocopherol and natural mixed tocopherol containing D-α-tocopherol, while the vitamin A-acid mentioned here refers to retinoic acid, particularly all-trans-retinoic acid. The tocopheryl retinoate of the present invention has the following general formula:

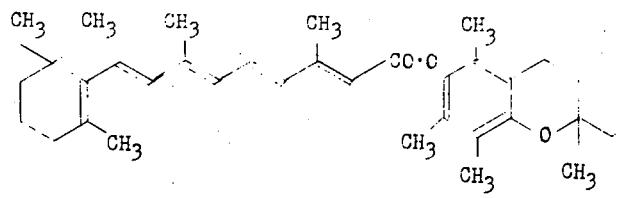
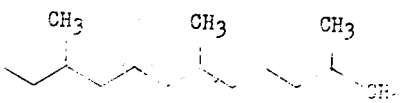

α-Tocopheryl retinoate

Various condensation methods may be applied to form the ester bond by the reaction of an α-tocopherol with a vitamin A-acid or an active substituted compound thereof such as an acid chloride.

PREFERRED EMBODIMENTS OF THE INVENTIVE METHOD

As for the synthesis process, there are several known ester-bond formation processes, for example, the direct condensation of α-tocopherol with vitamin A-acid over a dehydration catalyst such as dicyclohexylcarbodiimide or trifluoroacetic acid anhydride, or the condensation with vitamin A-acid in the form of an acid chloride thereof or an active ester thereof such as the p-toluensulfonic acid ester. However, in order to retain the steric structure of the conjugated double bonds of vitamin A-acid and prevent the isomerization and cyclization reaction, it is desirable to employ as mild reaction conditions as possible. From this point of view, the esterification reaction over trifluoroacetic acid anhydride is most preferable. Further, in case an acid halide-process is employed, it is necessary that vitamin A-acid or an alkali metal salt thereof is allowed to react with oxalyl chloride to produce the acid chloride, which is then subjected to the esterification in the presence of a base such as pyridine.

If vitamin A-acid esters of α-tocopherol obtained in such processes are purified by adsorption chromatography or molecular distillation, it easily becomes so pure that it can be used as a medicine.

EXAMPLE 1

Ten grams of trifluoroacetic acid anhydride dissolved in absolute dioxane was added dropwise below 10°C while stirring into 9g retinoic acid and 14g DL-α-tocopherol dissolved in 100ml absolute dioxane. After the dropwise addition, the mixture was allowed to stand for 3 hours at 40°C and the reaction product was extracted with ether, and washed with water, dilute alkali and water successively. The other layer was dehydrated with anhydrous sodium sulfate, then the solvent was removed by distillation under a reduced pressure to obtain 22g of a light yellow oily residue. The residue was adsorption-chromatographed over silica gel and the main elution band showing yellow in color which was eluted with 2 percent ethyl ether-containing hexane was collected and solvent of the eluent was removed to obtain 15g of light yellow oily DL-α-tocopheryl retinoate. The DL-α-tocopheryl retinoate thus obtained was a single substance in thin layer chromatography, and the assignments made from its infrared absorption spectrum, nuclear magnetic resonance spectrum and ultraviolet absorption spectrum are consistent with the molecular structure. The actual values found in elemental analysis agreed with the theoretical values.

Thin layer chromatograph on a silica gel plate Rf value
0.57 n-hexane : diethyl ether : methanol (65:30:5)
0.68 benzene : chloroform (4:1)
Reversed phase paper chromatograph on 5 percent n-paraffin impregnated paper
Rf value: 0.28 (paraffin-saturated dimethylformamide)

Elemental Analysis
Found         C: 82.63%    H: 10.95%
Theoretical   C: 82.63     H: 10.74     ($C_{49}H_{76}O_3$)

—Continued

Ultraviolet Absorption Spectrum
λ max     365nm     $E_{1cm}^{1\%} = 642$     (ethanol)
λ shoulder 298nm    $E_{1cm}^{1\%} = 136$     (ethanol)
λ min     255nm                               (ethanol)

Infrared Absorption Spectrum
2970, 1720, 1600, 1580, 1450, 1230, 1120, 960 cm$^{-1}$
(in oily state)

Nuclear Magnetic Resonance Spectrum
τ value (Deuterochloroform solution, trimethylsilane standard, 60MHz)
9.10, 9.01, 8.88, 8.66, 8.40, 8.13, 7.82, 7.75, 7.41, 7.25, 3.85, 3.72, 3.40, 3.12, 2.95

EXAMPLE 2

Eleven grams of retinoic acid was dissolved under cooling in 25g of a 2N potassium hydroxide aqueous solution, and freeze-drying was carried out to produce potassium retioatt which was then suspended retioate 200ml of benzene. A trace of pyridine was added into the suspension, then 10ml of oxalyl chloride was added dropwise with caution while stirring at 0°C in a stream of nitrogen. The reaction was allowed to take place for 15 min at 0°C and further for 1 hour more at room temperature. The reaction mixture was concentrated below 5°C under a reduced pressure. The residue was dissolved in ethylene dichloride and added dropwise in a period of about 5 min. into a solution of 20g DL-α-tocopherol and 20ml pyridine dissolved in 200ml ethylene dichloride. After that, the mixture was allowed to stand for a night at room temperature, then it was poured into ice-water, extracted with ether and washed with water, dilute hydrochloric acid, dilute alkali and water successively. The ether layer was dried with anhydrous sodium sulfate, then the solvent was removed by distillation under a reduced pressure. The residue was purified by chromatography in the same way as in Example 1 to obtain 12g of thin layer chromatographically and reversed phase chromatographically single DL-α-tocopheryl retinoate.

EXAMPLE 3

Trifluoroacetic acid anhydride (2.3g) dissolved in 10ml dioxane was added dropwise in a period of 15 minutes at 0°C while stirring in a stream of nitrogen into 3.5g retinoic acid and 4.3g D-α-tocopherol (obtained by subjecting natural mixed tocopherol to methylation, isolating it as D-α-tocopheryl hemisuccinate, then hydrolyzing it) dissolved in 30ml dioxane. The temperature was then increased to 40°C at which the reaction was allowed to take place for 4 hours, and the reaction product was then poured into ice-water and washed with water, dilute alkali and water. The ether layer was dehydrated with anhydrous sodium sulfate and the solvent was removed under a reduced pressure to obtain a residue, which was then purified by chromatography using 80g of silica gel in the same way as in Example 1 to obtain 4.3g of thin layer chromatographically and reversed phase chromatographically single D-α-tocopheryl retinoate.

Its Rf values in chromatography and physicochemical properties were completely the same as those of DL-α-tocopheryl retinoate and the two compounds did not separate in the mixed chromatography.

Pharmacological properties of DL-α-tocopheryl retinoate* shall be stated hereunder:

1. Acute Toxicity

Studies on acute toxicity of DL-α-tocopheryl retinoate and related compounds were carried out. The trials were conducted with ICR mice, weighing 25–30g, by oral and intravenous administration. Each compound was given to one group of 6 animals. The observations were continued for 7 days. Lichfield and Wilcoxon method was used for the calculation of LD50.

*The compound was synthesized through the condensation of DL-α-tocopherol and retinoic acid.

TABLE I

Acute Toxicity of Retinyl Acetate, Retinoic Acid, and DL-α-tocopheryl retinoate in mice

| Treatment | Route of Administration | LD50 (mg/Kg) |
|---|---|---|
| Retinyl Acetate | Intravenous | 432 |
| Retinoic Acid | Intravenous | 92 |
| Retinoic Acid | Oral | 780 |
| Toco. Retinoate | Intravenous | above 1,000 |
| Toco. Retinoate | Oral | above 2,000 |

As is shown in Table I, DL-α-tocopheryl retinoate shows very low acute toxicity in mice by oral and intravenous administration. It is very interesting that DL-α-tocopherol plays a very important role for the diminution of the toxicity of retinoic acid.

2. Wound Healing

K. H. Lee*[1] reported that retinoic acid and its related compounds promote skin wound healing in rats.

*[1] K. H. Lee, J. Pharm. Sci., 57, 1042 (1968) K. H. Lee and T. G. Tong, ibid, 58, 773 (1969)

The experiment was carried out to find the efficacy of DL-α-tocopheryl retinoate by the revised method of Lee's.

Sprague-Dawley male rats were anesthetized with ethyl ether. The hair on the back was depilated with an electric clipper. One incision, 6cm in length, was made through the skin and cutaneous muscles, at a distance about 1.5cm from the midline on each side. The incisions were closed with metal clips. The wounds were left undressed. Retinyl acetate, DL-α-tocopheryl retinoate, suspended in non-ionic surfactant*[2], and retinoic acid, dissolved in a minimum amount of NaOH solution, were injected into rats daily for 5 days. The dosage level for each compound was 5.16mg per kg per day.

*[2] HCO-60, polyoxyethylene-hydrogenated castor oil, made by Nikko Chemical Co., Tokyo, was used.

TABLE II

Effect of Retinyl Acetate, Retinoic Acid, and DL-α-Tocopheryl Retinoate on Skin Wound Healing in Rats.

| Group | No. of Animals | Drugs Applied | Mean Tensile Strength (g/cm) | Percent Control |
|---|---|---|---|---|
| I | 8 | Saline | 180.7 ± 18.0 | 100.0 |
| II | 7 | HCO-60 | 164.2 ± 13.8 | 90.9 |
| III | 8 | Retinyl Acetate | 160.1 ± 9.0 | 88.6 |
| IV | 8 | Retinoic Acid | 180.3 ± 9.1 | 99.8 |
| V | 8 | Toco. Retinoate | 204.2 ± 15.6 | 113.0 |

Among the three compounds tested, only DL-α-tocopheryl retinoate showed wound healing effect. The difference in mean tensile strength between DL-α-tocopheryl retinoate and control is statistically significant. Retinyl acetate and retinoic acid showed no promoting effect, contrary to Lee's observation. The discrepancy may be due to the method of administration.

3. Granuloma Formation

For the evaluation of granuloma formation, we modified slightly the method of cotton pellet by Winter, et al.

Two acetate fiber disks were implanted symmetrically at subcutaneous of abdominal site on Wister male rats, weighing 150–180g under ethyl ether anesthesia. Drugs, prepared in the same way as for the wound healing tests, were injected intraperitoneally during 5 days after operation. On the 6th day, granulomas were carefully separated and dried at 56°C for 6 hours in an electric dryer. After drying the disks were weighed.

The results obtained are summarized in Table III.

TABLE III

Effect of R.A., T.R. and V. E acetate on Granuloma Formation in Rats.

| Drugs | | V.E acetate | R.A. | T.R. |
|---|---|---|---|---|
| Granuloma | Treated | 22.6 ± 2.3mg | 31.8 ± 3.0mg | 30.1 ± 4.1mg |
| Weight | Control | 21.5 ± 2.1 | 26.9 ± 5.3 | 23.1 ± 3.7 |
| Difference | | 1.0 ± 1.6 | 5.5 ± 3.0 | 6.9 ± 2.9 |
| Control Percent | | 105.1% | 120.3% | 130.3% |
| Impregnated Dose | | 2.7 mg | 2.0 mg | 4.7 mg |
| No. of Animals | | 8 | 8 | 8 |

R.A.: Retinoic Acid,
T.R.: DL-α-Tocopheryl Retinoate
Granuloma: Induced by Acetate fiber disk Retinoic acid and DL-α-tocopheryl retinoate appear to strengthen granuloma formation.

What is claimed is:

1. A compound of the formula

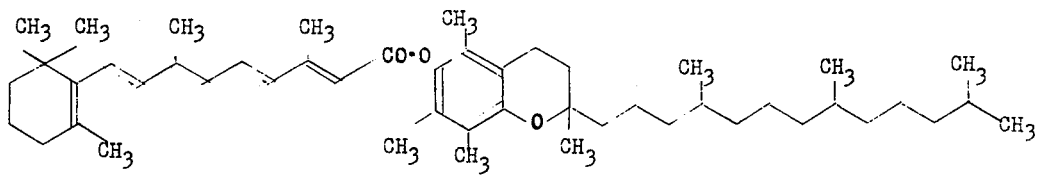

2. A process for preparing a vitamin A-acid ester of α-tocopherol which comprises subjecting an α-tocopherol to ester condensation with vitamin A-acid over trifluoroacetic acid anhydride to form an ester bond.

3. A process for preparing a vitamin A-acid ester of α-tocopherol which comprises reacting vitamin A-acid or an alkali metal salt thereof with oxalyl chloride to produce the acid chloride of the vitamin A-acid, and subjecting an α-tocopherol to ester condensation with the acid chloride in the presence of a base to form the ester bond.

* * * * *

UNITED STATES PATENT OFFICE
CERTIFICATE OF CORRECTION

Patent No. 3,878,202  Dated April 15, 1975

Inventor(s) Hideaki Fukawa and Kenichi Tanaka

It is certified that error appears in the above-identified patent and that said Letters Patent are hereby corrected as shown below:

In the heading of the Patent, in the space provided for priority information, insert the following:

-- Foreign Application Priority Data

May 17, 1971  Japan .................... 46-32450 --

Signed and Sealed this

Twenty-seventh Day of November 1979

[SEAL]

Attest:

RUTH C. MASON
Attesting Officer

LUTRELLE F. PARKER
Acting Commissioner of Patents and Trademarks